E. Wright,
Pipe Coupling,

Nº 18,116.     Patented Sept. 1, 1857.

Witnesses:
Joseph Garell
Albert Brown

Inventor:
Elinur Wright.

UNITED STATES PATENT OFFICE.

ELIZUR WRIGHT, OF BOSTON, MASSACHUSETTS.

PIPE-COUPLING.

Specification of Letters Patent No. 18,116, dated September 1, 1857.

*To all whom it may concern:*

Be it known that I, ELIZUR WRIGHT, of Boston, in the county of Suffolk and State of Massachusetts, have invented certain new and useful Improvements in the Manner of Coupling Water-Pipes, and that the following description, taken in connection with the accompanying drawings hereinafter referred to, forms a full and exact specification of the same, wherein I have set forth the nature and the principles of my said improvements by which my invention may be distinguished from others of a similar class, together with such parts as I claim and desire to have secured to me by Letters Patent.

The figures of the accompanying plate of drawings represent my improvements.

Figure 1:
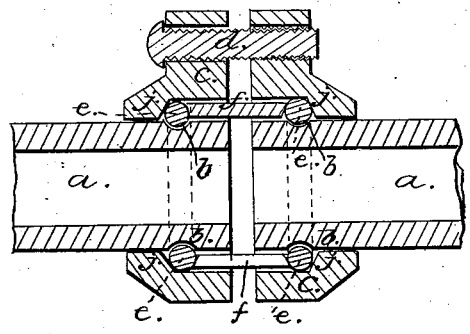
Figure 2:
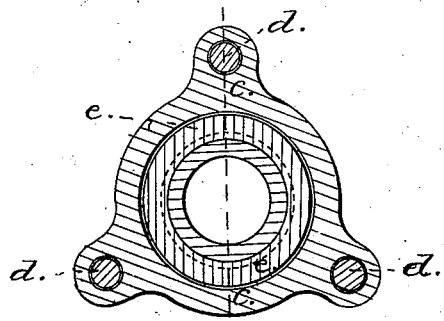
Figure 3:
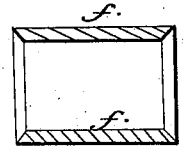

Figure 1 is a central, longitudinal, vertical section of my improved coupling. Fig. 2 is a transverse vertical section of the same. Fig. 3 is a sectional view of one of the devices to be hereinafter referred to.

The present invention has for its object the coupling together of water pipes in a cheap and efficacious manner and without the aid of solder. These results are secured by my improved coupling, no solder being used and no air-chamber required, a compressible elastic packing ring being inserted in a groove formed on each side of the joint and secured there in such a manner as to form a dowel by means of screw couplings and a thimble, each of which have beveled edges or shoulders that bind the elastic rings in the grooves.

$a, a$ in the drawings represent the two ends of pipes to be coupled, having grooves $b, b$ formed in them.

$c, c$ are the coupling caps of iron or brass with flanges having screw bolts $d, d, d$ tapped into them and having beveled shoulders $j, j$.

$e, e$ are packing rings which may be made of vulcanized rubber with a small wire in the center and which contract into the grooves so as to be easily pulled with the pipe into the coupling caps.

$f, f$ is a thimble of brass or other suitable metal, with its ends beveled in reverse of the shoulders $j, j$ of the coupling caps, so that when the screw bolts $d, d$, are turned, or the coupling caps are otherwise screwed or keyed up, the packing rings are forcibly pressed down into the grooves and any pressure of the fluid only tends to make the joint tighter.

The advantages of this mode of coupling are, that it is much cheaper than a soldered joint, equally durable, and applicable, with a proper tool for making the grooves, to leaden water pipes at a moment's notice by any person of ordinary mechanical skill. It also has the advantage of dispensing with air chambers, as the elasticity of the joints is sufficient to absorb the momentum of the water or water-hammer, and the packing rings have so far the character of a dowel, that it will take as much force to pull the pipe out of the coupling as it will to burst it. It will be perceived that the grooves in the pipes are an essential feature of the coupling, as without them in spite of any amount of friction, the ends must slip out as the result of the hydrostatic pressure; but the rubber being bedded into the pipe and held firmly there, must be cut sheer off all around before the pipes can come apart. Of course when one pipe is to be branched into another there must be a T shaped tube for the coupling caps to attach to.

Having thus described my improvements I shall state my claim as follows:

What I claim as my invention and desire to have secured to me by Letters Patent, is—

The use of a compressible packing ring inserted in a groove around the pipe on each side of the joint, in combination with screw threaded or flanged and bolted couplings, and a thimble for holding the packing ring in the grooves, so as to form a water-tight joint and resist separation by the packing ring serving as a dowel.

ELIZUR WRIGHT.

Witnesses:
JOSEPH GAVETI,
ALBERT BROWN.